United States Patent
Kim

(10) Patent No.: US 10,161,440 B2
(45) Date of Patent: Dec. 25, 2018

(54) CONNECTING ROD WITH MECHANISM FOR VARYING COMPRESSION RATIO

(71) Applicants: Hyundai Motor Company, Seoul (KR); Kia Motors Corporation, Seoul (KR)

(72) Inventor: Won-Gyu Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/831,872

(22) Filed: Dec. 5, 2017

(65) Prior Publication Data

US 2018/0320732 A1 Nov. 8, 2018

(30) Foreign Application Priority Data

May 2, 2017 (KR) .................. 10-2017-0055986

(51) Int. Cl.
*F16C 7/06* (2006.01)
*F02B 75/04* (2006.01)
*F02D 15/02* (2006.01)
*F16C 9/04* (2006.01)

(52) U.S. Cl.
CPC .............. *F16C 7/06* (2013.01); *F02B 75/045* (2013.01); *F02D 15/02* (2013.01); *F16C 9/04* (2013.01)

(58) Field of Classification Search
CPC .... F16C 7/06; F16C 9/04; F02B 75/04; F02B 75/045; F02D 15/00; F02D 15/02
USPC .................................. 123/197.3, 48 B, 78 E
See application file for complete search history.

(56) References Cited

U.S. PATENT DOCUMENTS

| | | | | |
|---|---|---|---|---|
| 4,864,975 | A * | 9/1989 | Hasegawa | F02B 75/045 123/48 B |
| 6,752,105 | B2 * | 6/2004 | Gray, Jr. | F02B 75/045 123/48 B |
| 10,006,482 | B2 * | 6/2018 | Kim | F02B 75/045 |
| 2017/0159559 | A1 * | 6/2017 | Meacham | F16C 7/06 |
| 2017/0268419 | A1 * | 9/2017 | Kim | F02B 75/04 |

FOREIGN PATENT DOCUMENTS

| | | | | |
|---|---|---|---|---|
| JP | 2015137768 A | * | 7/2015 | ........... F02B 75/044 |
| KR | 10-1539484 B1 | | 7/2015 | |
| KR | 10-1672650 B1 | | 11/2016 | |
| KR | 10-1683515 B1 | | 12/2016 | |
| WO | WO 2015200432 A1 | * | 12/2015 | ................ F16C 7/06 |

* cited by examiner

*Primary Examiner* — Grant Moubry
(74) *Attorney, Agent, or Firm* — Mintz Levin Cohn Ferris Glovsky and Popeo, P.C.; Peter F. Corless

(57) ABSTRACT

A connecting rod is provided that includes an eccentric mechanism. The eccentric mechanism is installed at a connecting rod end of the connecting rod to change a height of a piston to change a compression ratio. Accordingly, the compression ratio is adjusted more stably by performing phase control.

7 Claims, 7 Drawing Sheets

CONNECTING ROD WITH MECHANISM FOR VARYING COMPRESSION RATIO

CROSS-REFERENCE TO RELATED APPLICATIONS

This application claims priority under 35 U.S.C. § 119 to Korean Patent Application No. 10-2017-0055986, filed on May 2, 2017, the disclosure of which is incorporated herein by reference in its entirety.

BACKGROUND

1. Field of the Invention

The present invention relates to a connecting rod, and more particularly, to a connecting rod having an eccentric mechanism installed at a connecting rod end of the connecting rod to change a height of a piston to change a compression ratio, thereby stably adjusting the compression ratio by performing phase control.

2. Description of the Related Art

In general, thermal efficiency of a heat engine is increased as a compression ratio is increased, and for a spark ignition engine, thermal efficiency is increased by advancing ignition timing to a predetermined level. However, abnormal combustion occurs in the spark ignition engine when the ignition timing is advanced at a high compression ratio, which may cause damage to the engine. Therefore, there is a limitation in advancing the ignition timing, and as a result, there is a disadvantage in respect to deterioration in output.

A variable compression ratio (VCR) device refers to a device that changes a compression ratio of a gaseous mixture based on an operational state of the engine. The variable compression ratio device improves fuel efficiency by increasing a compression ratio of the gaseous mixture in a low-load condition of the engine, and improves an engine output and prevents occurrence of knocking by decreasing a compression ratio of the gaseous mixture in a high-load condition of the engine. However, the existing variable compression ratio technology uses oil pressure of an actuator such as an electric motor to change a compression ratio, and as a result, a capacity of an oil pump is increased and an electrical load is increased due to the electric motor with a high capacity.

Therefore, it is necessary to improve fuel efficiency by achieving a high compression ratio by increasing a height of a connecting rod when a vehicle is being driven at a low speed, and to improve knocking characteristics by achieving a low compression ratio by decreasing the height of the connecting rod when the vehicle is being driven at a high speed. However, in the related art, the height of the connecting rod is fixed, and as a result, it is difficult to change the compression ratio of the engine of the vehicle based on an operational state of the vehicle.

As a solution for solving the problem, as illustrated in FIG. 1A, an eccentric cam is provided at a connecting rod end to move a position of a piston pin vertically to implement a variable compression ratio. An eccentric cam 20 is supported at a connecting rod end 10, and cylinders 30 and 40 are connected to both ends of the eccentric cam 20 through rods 31 and 41.

In this particular, as illustrated in FIG. 1B, the cylinders 30 and 40 are connected to a hydraulic circuit that includes an orifice 52, a check valve 51, and an adjustment valve 50.

The adjustment valve 50 changes a hydraulic circuit while being moved horizontally by a control cam mounted on a cylinder block. The eccentric cam 20 at the end of the connecting rod 10 generates force in a clockwise or counterclockwise direction by a reciprocal movement of the piston, and as a result, the cylinders 30 and 40 alternately receive force in different phases that compresses or expands the cylinders 30 and 40.

In particular, oil is introduced or discharged in one direction by the force that compresses or expands the cylinders 30 and 40 by the hydraulic circuit, and thus, the eccentric cam 20 at the end of the connecting rod 10 rotates only in one direction, and the rotation direction is adjusted by the adjustment valve 50. Therefore, the position of the position is fixed at an upper or lower position based on the position of the adjustment valve 50, and as a result, the compression ratio varies.

In the related art with the aforementioned configurations, to change the height of the piston, the eccentric cam 20 is installed at the connecting rod end 10, the cylinders 30 and 40 include two hydraulic cylinders, and the respective cylinders 30 and 40 are connected to the connecting rod end 10 through the rods 31 and 41. The hydraulic cylinders are operated by the hydraulic circuit embedded in the connecting rod, and a separate adjustment cam is installed on the block and operated to switch the adjustment valve to change the compression ratio.

However, the related art has the following problems.

First, force, which is applied to the eccentric cam by the piston, needs to be supported by oil pressure of the two hydraulic cylinder, and as a result, durability and sealing properties against high pressure are required. In other words, in the VCR engine with the variable connecting rod end, a countermeasure (durability and sealing) against substantially high pressure is required and it is difficult to ensure quality when using the existing hydraulic pressure to control the compression ratio.

Second, a separate adjustment valve control cam is required on the cylinder block to control the adjustment valve.

Therefore, as a solution for solving the aforementioned problems, the present invention proposes a connecting rod end at which an eccentric mechanism is installed to eliminate uncertainty caused by hydraulic pressure by using a one-way clutch and to stably adjust the compression ratio.

SUMMARY

The present invention provides a connecting rod having an eccentric mechanism installed at a connecting rod end of the connecting rod to change a height of a piston to change a compression ratio, thereby more stably adjusting the compression ratio by performing phase control.

An exemplary embodiment of the present invention provides a connecting rod equipped with an eccentric mechanism, the connecting rod may include: an eccentric cam which is installed at a connecting rod end (e.g., a smaller end of the connecting rod) of the connecting rod; and the eccentric mechanism configured to adjust a phase of the eccentric cam, in which the eccentric mechanism may include a one-way clutch having elements such as balls, rollers, and needles installed on respective outer circumferential surfaces of left and right circular protruding portions of the eccentric cam, and cages having space portions for accommodating the elements such as the balls, the rollers, and the needles.

In the connecting rod of the present invention, the eccentric cam and the one-way clutch may be installed at the connecting rod end, with a center of the piston pin disposed not to coincide with a rotation center of the eccentric cam. Therefore, when the piston transmits force such as pressure in a combustion chamber pressure, inertial force, and the like to the eccentric cam through the piston pin, the force acts as clockwise or counterclockwise torque to rotate the eccentric cam. In particular, the clockwise or counterclockwise rotation of the eccentric cam may be adjusted the torque by using the one-way clutch, and thus, it is not necessary to use high pressure for supporting oil pressure of the two hydraulic cylinders in the related art, thereby improving durability of an engine and sealing quality. Unlike the related art, a separate adjustment valve control cam may be omitted from a cylinder block to operate the adjustment valve, and as a result, manufacturing productivity may be improved and costs may be reduced.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIGS. 5A to 5D are views illustrating an operation of the connecting rod small end according to an exemplary embodiment of the present invention, in which FIG. 5A is a view illustrating a state in which the eccentric cam moves clockwise by the one-way clutch and torque of the eccentric cam which is generated by reciprocating motion of a piston, FIG. 5B is a view illustrating a state in which the eccentric cam moves counterclockwise by the one-way clutch and torque of the eccentric cam which is generated by the reciprocating motion of the piston, FIG. 5C is an enlarged cross-sectional view of main part a in FIG. 5A, and FIG. 5D is an enlarged cross-sectional view of main part b in FIG. 5B;

DETAILED DESCRIPTION

Figure 1A:
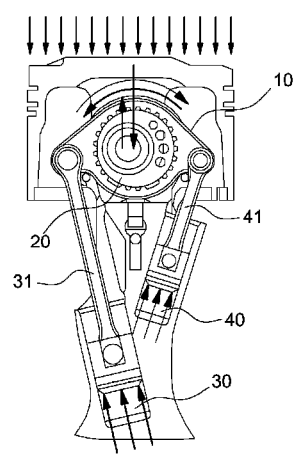
FIGS. 1A-1B are views illustrating a state in which an eccentric cam is installed at a connecting rod small end and hydraulic cylinders are installed at both sides of the eccentric cam in order to change a height of a piston in the related art.
Figure 1B:
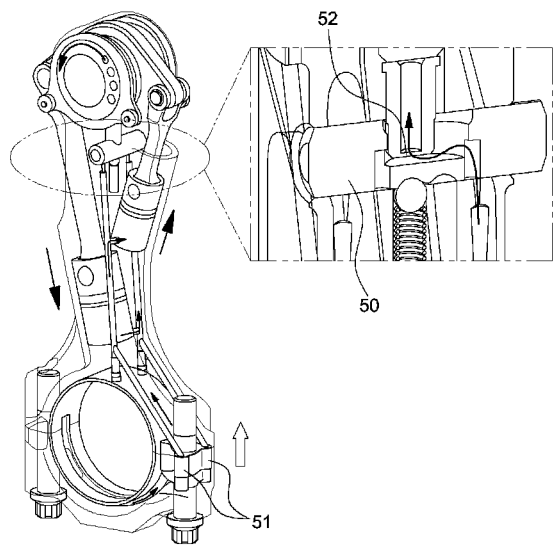

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to the accompanying drawings so that those skilled in the art to which the present invention pertains may easily carry out the present invention. However, the present invention may be implemented in various different ways, and is not limited to exemplary embodiments described herein.

A part irrelevant to the description will be omitted to clearly describe the present invention, and the same or similar constituent elements will be designated by the same reference numerals throughout the specification. Terms or words used in the specification and the claims should not be interpreted as being limited to a general or dictionary meaning and should be interpreted as a meaning and a concept which conform to the technical spirit of the present invention based on a principle that an inventor may appropriately define a concept of a term in order to describe his/her own invention by the best method.

Hereinafter, exemplary embodiments of the present invention will be described in detail with reference to the accompanying drawings. Particularly, a connecting rod of the present invention, on which an eccentric mechanism is installed, may be installed in a variable compression ratio engine that includes a piston and a piston pin mounted on the piston.

Figure 2:
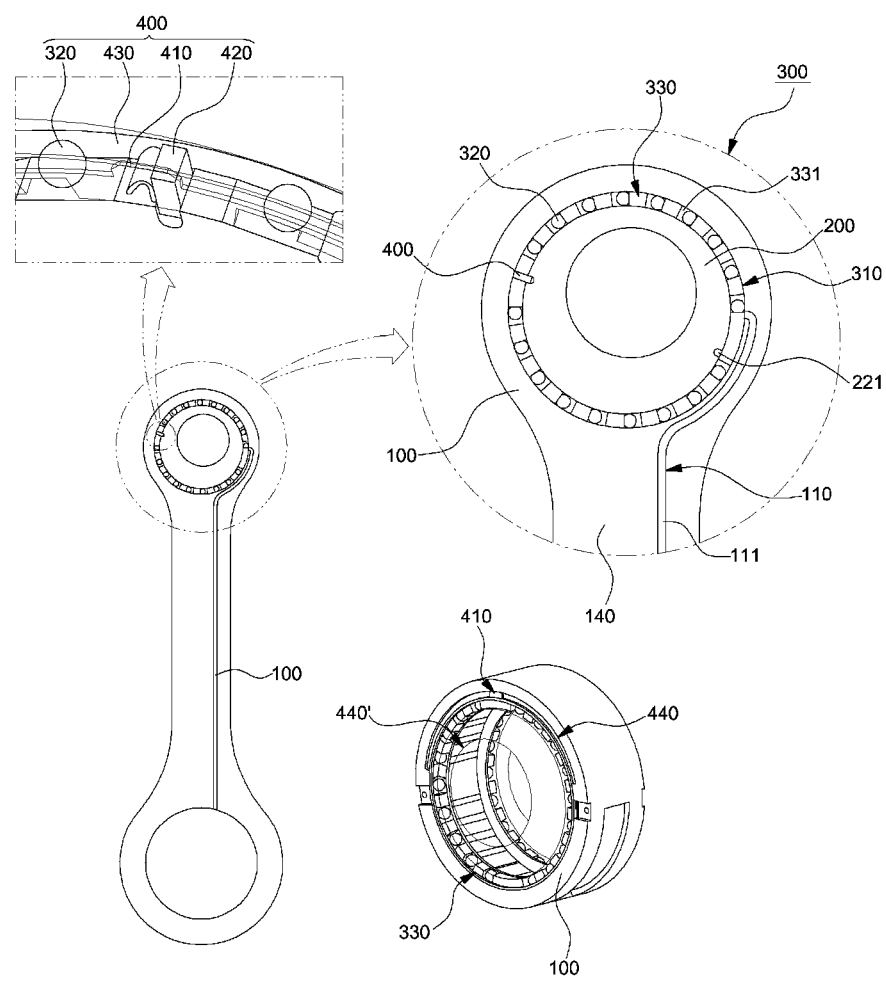
FIG. 2 is a view illustrating a connecting rod according to an exemplary embodiment of the present invention.
Figure 3:
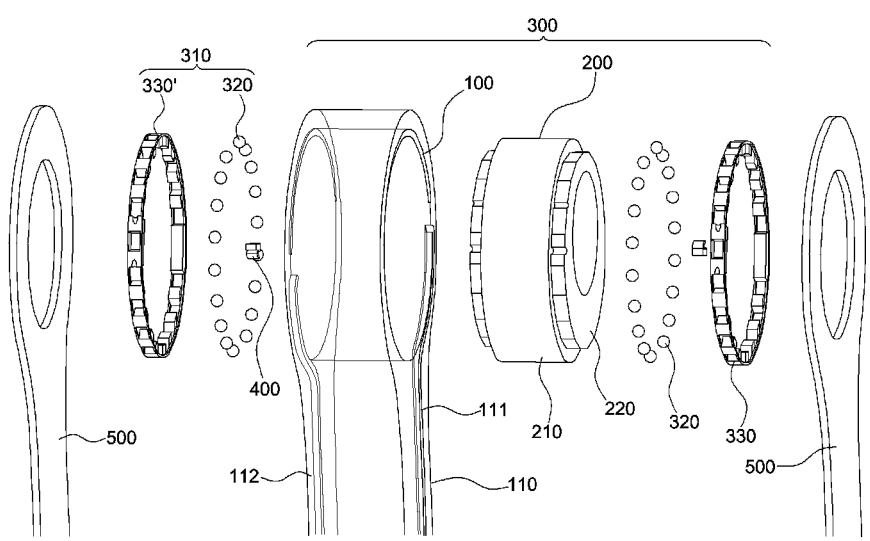
FIG. 3 is a detailed view illustrating an end of the connecting rod according to an exemplary embodiment of the present invention.

As illustrated in FIG. 2 or 3, the connecting rod of the present invention may include a connecting rod end 100 (e.g., a smaller end of the connecting rod, an operating end of the connecting rod, or a first end), an eccentric cam 200, and an eccentric mechanism 300. The eccentric cam 200 may be positioned at a center of the connecting rod end 100. In particular, a center of the piston pin (not illustrated) of the piston is disposed not to coincide with a rotation center of the eccentric cam 200, to thus vary a height of a piston in a combustion chamber of the engine while the center of the piston pin moves vertically based on a rotation direction of the eccentric cam 200.

When the piston transmits force such as pressure in the combustion chamber and inertial force to the eccentric cam 200 through the piston pin, the force rotates the eccentric cam 200 by torque in a clockwise or counterclockwise direction. The connecting rod of the present invention may use the eccentric mechanism 300 to adjust a clockwise or counterclockwise rotation of the eccentric cam 200 by torque. More specifically, referring to FIGS. 2 and 3, the eccentric cam 200 may include circular protruding portions 220 at left and right sides of a main body 210.

The circular protruding portions 220 may have two or more flat surface portions and two arc portions. The flat surface portion may provide a one-way clutch function, and ball components 320 such as balls, rollers, and needles may be positioned on the flat surface portion. A particular arc shape or profile may be provided instead of the flat surface to perform the one-way clutch function. One of the two arc portions is a portion where a stopper 420 and a spring 430 illustrated in FIG. 4B may be positioned, and may have a groove 221 for fixing the stopper. The other arc portion is a portion that seals hydraulic pressure together with a cage piston 450 of the cage 330 and the end 100, and a direction in which a clutch 310 is locked may be determined by adjusting a position of the cage 330 by applying force to the cage piston 450 by adjusted hydraulic pressure.

For convenience, a side of a left circular protruding portion is referred to as a rear side, and a side of a right circular protruding portion is referred to as a front side. Since the front sides and the rear sides of the components, such as the eccentric mechanism 300, safety devices 400, and oil supply device 110 to be described below, are symmetric, only components, which are provided at any one of the front side and the rear side and have the same name and shape, will be described.

As illustrated in FIG. 3, the eccentric mechanism 300 may include the ball components 320 installed on respective outer circumferential surfaces of the left and right circular protruding portions 220 of the eccentric cam 200, and the one-way clutch 310 having front and rear cages 330 and 330' installed on the left and right circular protruding portions 220 and have space portions 331 and 332 (e.g., cavities) for accommodating the ball components 320.

Figure 4A:
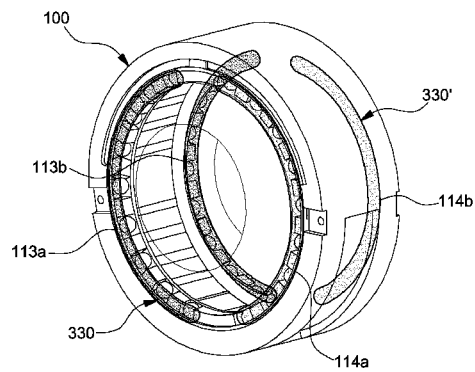
FIGS. 4A-4B are views illustrating a one-way clutch, an eccentric cam, and a hydraulic line which are installed at the small end of the connecting rod according to an exemplary embodiment of the present invention.
Figure 4B:
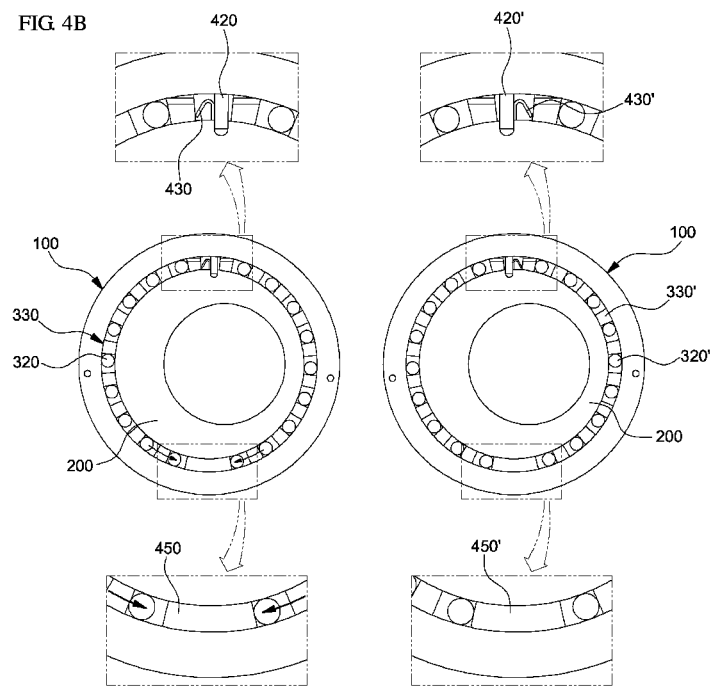

The eccentric mechanism 300 may include an oil supply device 110 formed at front and rear sides of the end 100, respectively, and supplied with oil for operating the one-way clutch 310. The oil supply device 110 may include first and second oil lines 111 and 112 formed at the small 100. In particular, as illustrated in FIG. 4A or 4B, the first oil line 111 may be connected to a first front side chamber 113a to transmit hydraulic pressure to the front cage 330 in the connecting rod end 100, and a first rear side chamber 113b to transmit hydraulic pressure to the rear cage 330'.

The second oil line 112 may be connected to a second front side chamber 114a to transmit hydraulic pressure to the front cage 330 in the connecting rod end 100, and a second rear side chamber 114b to transmit hydraulic pressure to the rear cage 330'. Therefore, the hydraulic pressure supplied to the first oil line 111 may be transmitted only to the chambers 113a and 113b of the front and rear cages 330 and 330', and the hydraulic pressure supplied to the second oil line 112 may be transmitted only to the chambers 114a and 114b of the front and rear cages 330 and 330', and thus, phases of the front and rear cages 330 and 330' may be controlled which will be described below.

The oil supply device 110 and the front and rear cages 330 and 330' may be shielded by covers 500 to maintain an airtight state. In exemplary embodiment of the present invention, the ball components 320 may be formed as typical balls, but may also be formed as needles, rollers, or other mechanisms for the one-way clutch. A safety device 400 may be installed on any one of the front and rear cages 330 and 330' to prevent the phase of the eccentric cam 200 from deviating from a predetermined range when a rotational speed of the eccentric cam 200 is excessive or the front and rear cages 330 and 330' operate abnormally.

As illustrated in the enlarged view of the main part in FIG. 2, the safety device 400 may include a stopper cage 410 installed on any one of the front and rear cages 330 and 330', and stopper grooves 440 and 440' positioned at eccentric sides of the connecting rod end 100, and the phases of the front and rear cages 330 and 330' may be restricted within a predetermined angle by the stopper cage 410.

An operation of the connecting rod of the present invention, which is configured as described above and on which the eccentric mechanism is installed, will be described in detail. FIGS. 5A-5D are views illustrating a basic operation of the connecting rod of the present invention. First, when the engine equipped with the connecting rod of the present invention operates, the piston applies tensile force or compressive force to the connecting rod 100 through the piston pin by inertial force, pressure in the combustion chamber, or the like, and the tensile force or the compressive force acts as torque and vertical force applied to the eccentric cam 200.

The torque is supported by the one-way clutch 310, and the vertical force is supported by a sliding bearing installed at a central portion of the body of the eccentric cam 200. In particular, the clockwise or counterclockwise rotation of the eccentric cam 200 may be adjusted by front and rear one-way clutches 310 and 310' installed on the circular protruding portions 220 of the eccentric cam 200, and locking and unlocking of the one-way clutches 310 and 310' may be determined by the phases of the cages 330 and 330'.

Figure 5A:
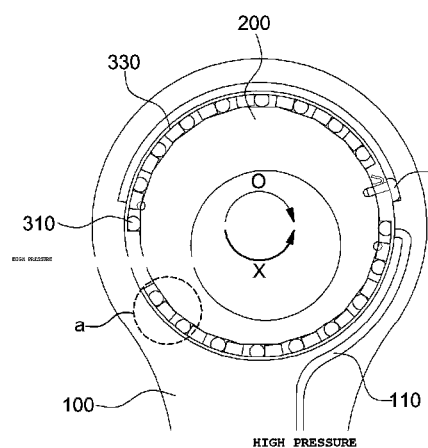
Figure 5B:
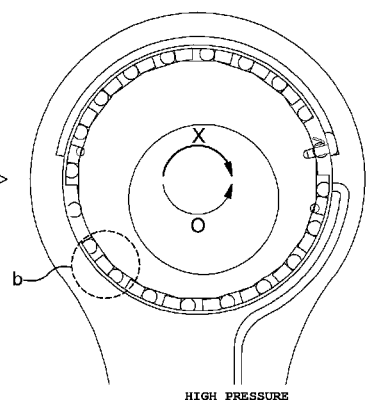
Figure 5C:
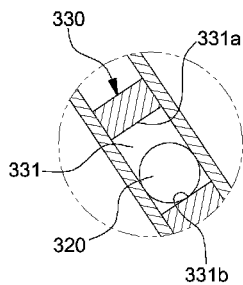

In other words, when the front cage 330 rotates clockwise based on the eccentric cam 200 as illustrated in FIG. 5A, the ball components 320 contact a left inner wall 331a of the space portion 331 as illustrated in FIG. 5C, and thus, when the eccentric cam 200 rotates clockwise, a distance between the flat surface portion of the circular protruding portion 220 surrounding the balls and the connecting rod end 100 is increased when the ball components 320 roll, and as a result, the eccentric cam 200 may rotate. However, when the eccentric cam 200 rotates counterclockwise, the distance between the flat surface portion of the circular protruding portion 220 surrounding the balls and the connecting rod end 100 is decreased when the ball components 320 roll, and as a result, the eccentric cam 200 may not be rotated.

Figure 5D:
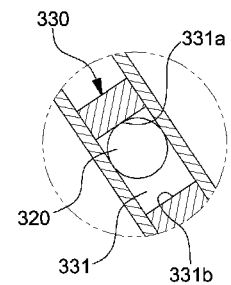

In contrast, when the cage 330 rotates counterclockwise based on the eccentric cam 200 as illustrated in FIG. 5B and the eccentric cam 200 rotates counterclockwise when the ball components 320 contact a right inner wall 331b of the space portion 331 as illustrated in FIG. 5D, the distance between the flat surface portion of the circular protruding portion 220 surrounding the balls and the connecting rod end 100 is increased when the ball components 320 roll, and as a result, the eccentric cam 200 may rotate. However, when the eccentric cam rotates clockwise, the distance between the flat surface portion of the circular protruding portion 220 surrounding the balls and the connecting rod end 100 is decreased when the ball components 320 roll, the eccentric cam 200 may not be rotated.

In the exemplary embodiment of the present invention, the position of the cage 330 may be determined by a difference in hydraulic pressure supplied from the first and second oil lines 111 and 112 of the cage 330. In other words, a hydraulic pressure signal may be transmitted to the oil supply device 110 to rotate the eccentric cam 200 clockwise or counterclockwise or fix the eccentric cam 200, and forces may be applied to the cage pistons 450 and 450' of the front and rear cages 330 and 330' by the hydraulic pressure. Rotational torque may be applied to the cages by the forces, and the positions of the front and rear cages 330 and 330' may vary by a force equilibrium relationship with the spring 430, and as a result, the eccentric cam 200 may be rotated clockwise or counterclockwise or the eccentric cam 200 may be fixed.

Figure 6A:
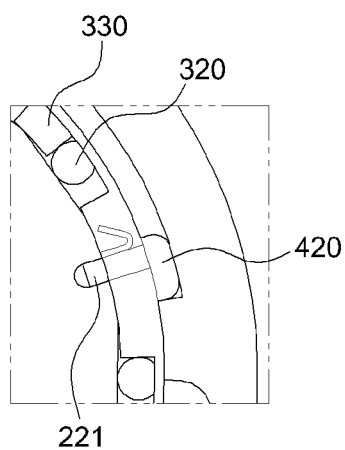
FIGS. 6A and 6B are views illustrating a state in which a position of a cage varies by a stopper according to an exemplary embodiment of the present invention.
Figure 6B:
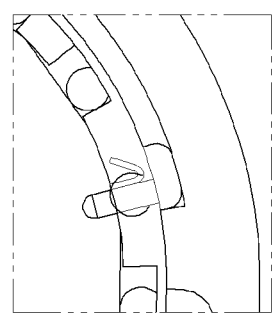

Meanwhile, the phase of the eccentric cam 200 may deviate from a predetermined range when a rotational speed of the eccentric cam 200 is excessive (e.g., greater than a particular speed) or the front and rear cages 330 and 330' operate abnormally. Accordingly, as illustrated in FIGS. 6A-6B, the movement of the stopper cage 410 may be restricted by the stopper grooves 440 and 440' positioned at the eccentric sides of the connecting rod end 100, such that the stopper cage 410 operates as a safety device to restrict the eccentric cam 200 within a predetermined range.

Position control of the front and rear cages 330 and 330' based on hydraulic pressure of the one-way clutch 310 will be more specifically described with reference to Table 1 and FIG. 3 or 4A to 7F.

TABLE 1

| Oil Line Pressure and Bias Pressure (Pb) of Spring | Front Side | Rear Side | Variable Compression Ratio (VCR) |
|---|---|---|---|
| Second Oil Line < First Oil Line − Pb | CCW | CCW | CCW (Decrease in Compression Ratio) |
| First Oil Line − Pb < Second Oil Line < First Oil Line + Pb | CCW | CW | Fixed (When engine is stopped or operates normally) |
| First Oil Line + Pb < Second Oil Line | CW | CW | CW (Increase in Compression Ratio) |

Table 1 shows an operation of the eccentric cam 200 based on hydraulic pressure supplied to the first oil line 111 and the second oil line 112 to adjust the positions of the front and rear cages 330 according to the exemplary embodiment of the present invention.

First, when no hydraulic pressure is supplied to the one-way clutch 310 of the present invention, the positions of the front and rear cages 330 and 330' may be determined by the stopper 420 and the spring 430, and bias pressure that corresponds to elastic force of the spring 430 is indicated by Pb in Table 1. The torque applied to the cages 330 and 330' by the hydraulic pressure of the first and second oil lines 111 and 112 and forces of the springs 430 and 430' (hereinafter, referred to as front and rear springs for convenience, see FIG. 4B) is as follows.

When the hydraulic pressure is supplied to the first oil line 111, a force in the right direction is applied to the cage pistons 450 and 450' of the cages 330 and 330', to allow the cage pistons 450 and 450' to receive torque in a counterclockwise (CCW) direction. When the hydraulic pressure is supplied to the second oil line 112, a force in the left direction is applied to the cage pistons 450 and 450' of the cages 330 and 330', to allow the cage pistons 450 and 450' to receive torque in a clockwise (CW) direction. In particular, the front cage 330 may be configured to receive torque in the counterclockwise (CCW) direction by the force of the front spring 430.

Additionally, the rear cage 330' may be configured to receive torque in the clockwise (CW) direction by the force of the rear spring 430'. Motions of the cages 330 and 330' based on control pressure of the first and second oil lines 111 and 112 will be described, and an operation of controlling a length of the connecting rod by the motion of the eccentric cam 200 will be described.

First, for "Second Oil Line<First Oil Line−(Pb)" as shown in Table 1, the counterclockwise (CCW) torque by the first oil line is greater than the clockwise (CW) torque by the second oil line in the cage piston 450 of the front cage 330 illustrated in FIGS. 4A-4B, and the cage piston 450 moves counterclockwise (CCW) based on the stopper 420 by the counterclockwise torque by the spring 430. With this motion, the ball components 320 are pushed to one side surface 331a of the cage as illustrated in FIG. 5B or 5D. Therefore, on the principle of the one-way clutch 310, the clockwise (CW) motion of the eccentric cam is locked, and the counterclockwise (CCW) motion of the eccentric cam is enabled.

The cage piston 450' of the rear cage 330' illustrated in the right side of FIG. 4B receives force in the right direction, and the force applied to the cage piston 450' by the oil pressure of the first oil line is greater than a sum of the force of the spring 430' and the force applied to the cage piston 450' by the oil pressure of the second oil line, and thus, the cage piston 450' may be configured to move counterclockwise (CCW).

Figure 7A:
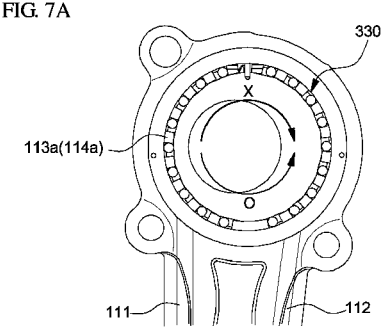
FIGS. 7A to 7F are views illustrating a state in which a position of the cage is controlled based on a hydraulic pressure signal according to an exemplary embodiment of the present invention.
Figure 7B:
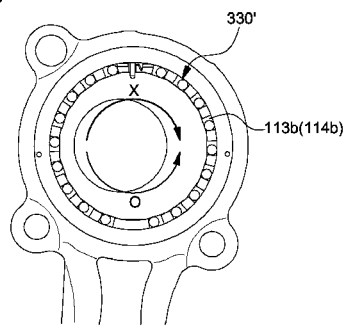

Accordingly, the ball components 320' are pushed to one side surface 331a' of the rear cage 330' as illustrated in FIG. 5B or 5D. Therefore, on the principle of the one-way clutch 310', the clockwise (CW) motion of the eccentric cam is locked, and the counterclockwise (CCW) motion of the eccentric cam is enabled. Therefore, as illustrated in FIGS. 7A and 7B, the eccentric cam 200 may be configured to rotate counterclockwise (CCW) by a counterclockwise reaction force applied to the one-way clutches 310 and 310' mounted at the front and rear sides of the eccentric cam 200, but may be prevented from rotating clockwise (CW). The height of the piston installed on the connecting rod equipped with the eccentric cam 200 may be increased by the counterclockwise (CCW) rotation of the eccentric cam 200, to thus decrease the variable compression ratio.

Further, for "First Oil Line−Pb<Second Oil Line<First Oil Line+Pb" as shown in Table 1, force in the left or right direction, which is generated by a difference between pressure of the first oil line and pressure of the second oil line, may be applied to the cage piston 450 of the front cage 330 illustrated in the left side of FIG. 4A, but a magnitude of the force is less than that of the force of the spring 430. Therefore, the front cage 330 may be configured to move counterclockwise (CCW) by the force of the spring 430. Accordingly, the ball components 320 are pushed to one side surface 331a of the cage as illustrated in FIG. 5B or 5D. Therefore, on the principle of the one-way clutch 310, the clockwise (CW) motion of the eccentric cam is locked, and the counterclockwise (CCW) motion of the eccentric cam is enabled.

Force in the left or right direction, generated by a difference between pressure of the first oil line and pressure of the second oil line, may be applied to the cage piston 450' of the rear cage 330' illustrated in the right side of FIG. 4B, but a magnitude of the force is less than that of the force of the spring 430'. Therefore, the rear cage 330' may be configured to move clockwise (CW) by the force of the spring 430'. Accordingly, the ball components 320' are pushed to the other side surface 331b' of the cage as illustrated in FIG. 5A or 5C. Therefore, on the principle of the one-way clutch 310', the counterclockwise (CCW) motion of the eccentric cam is locked, and the clockwise (CW) motion of the eccentric cam is enabled.

Figure 7C:
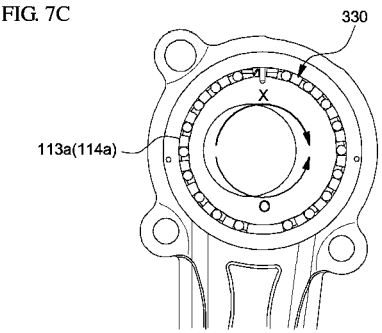
Figure 7D:
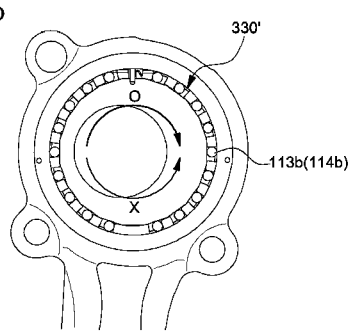

Therefore, as illustrated in FIGS. 7C and 7D, the eccentric cam 200 may be configured to rotate only in the direction in which the one-way clutches 310 and 310' mounted at the front and rear sides of the eccentric cam 200 are opposite to each other, and as a result, the eccentric cam 220 may be fixed without rotating, and the variable compression ratio by the piston installed on the connecting rod equipped with the eccentric cam 200 may be fixed. The fixed state of the variable compression ratio may be realized when no oil is supplied to the first and second oil lines mainly when the engine is stopped, or when the engine operates without changing the compression ratio.

Lastly, for "First Oil Line+Pb<Second Oil Line" as shown in Table 1, force in the left direction is applied to the cage piston 450 of the front cage 330 illustrated in FIG. 4A by the hydraulic pressure of the second oil line, and this force is greater than a sum of the force by the hydraulic pressure of the first oil line and the force of the spring 430, and thus, the front cage 330 may be configured to move clockwise (CW). Accordingly, the ball components 320 are pushed to the other side surface 331b of the cage as illustrated in FIG. 5A or 5C. Therefore, on the principle of the one-way clutch 310, the counterclockwise (CCW) motion of the eccentric cam is locked, and the clockwise (CW) motion of the eccentric cam is enabled.

Force in the left direction is applied to the cage piston 450' of the rear cage 330' illustrated in the right side of FIG. 4B by the hydraulic pressure of the second oil line, and the rear cage 330' may be configured to move clockwise (CW) by the force of the spring 430' and the force applied to the cage piston 450'. Accordingly, the ball components 320' are pushed to the other side surface 331a' of the cage as illustrated in FIG. 5A or 5C. Therefore, on the principle of the one-way clutch 310', the counterclockwise (CCW) motion of the eccentric cam is locked, and the clockwise (CW) motion of the eccentric cam is enabled.

Figure 7E:
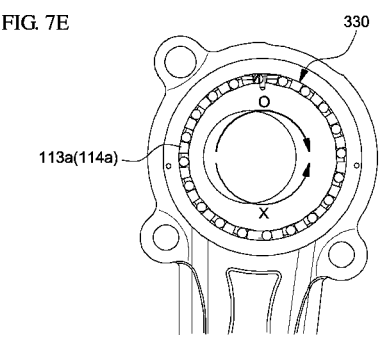
Figure 7F:
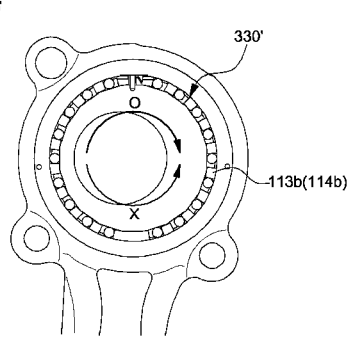

Therefore, as illustrated in FIGS. 7E and 7F, the eccentric cam 200 of the present invention may be configured to rotate clockwise (CW) by a clockwise reaction force applied to the front and rear one-way clutches 310 and 310' mounted at the front and rear sides of the eccentric cam 200, but may be prevented from rotating counterclockwise (CCW). The height of the piston installed on the connecting rod equipped with the eccentric cam 200 may be decreased by the clockwise (CW) rotation of the eccentric cam 200 to thus increase the variable compression ratio.

Meanwhile, the oil supplied to the cages 330 and 330' may be supplied in various ways as follows.

First, in a method of supplying control oil pressure in a main bearing, an oil pressure signal for operating the cage of the one-way clutch may be supplied in a main gallery OCV in the order of the main bearing→a main journal→a crank pin→a second connecting rod end→a connecting rod shank→a first connecting rod end. In particular, the first connecting rod end may refer to an end of the connecting rod which is smaller than that of a second connecting rod end.

Second, as another method, in a method of supplying control oil pressure using piston cooling jet, an oil pressure signal for operating the cage of the one-way clutch is supplied in an OCV1 and an OCV12 in the order of the main bearing→the piston cooling jet→piston inside gallery→the connecting rod pin→the eccentric cam→the cage.

Third, as still another method, in a method of using a connecting rod switch, that is, adjusting control oil pressure, an oil pressure signal for operating the cage of the one-way clutch is adjusted by a hydraulic pressure switch installed on the connecting rod. In a flow path, the oil pressure signal is supplied in the order of the crank pin→the second connecting rod end→the connecting rod shank→the hydraulic pressure switch→the first connecting rod end→the cage.

While the present invention has been described with reference to the exemplary embodiment and the accompanying drawings, different exemplary embodiments may be implemented within the spirit and the scope of the present invention. Therefore, it should be construed that the scope of the present invention is defined by the appended claims, and is not limited to the particular exemplary embodiment disclosed in the present specification.

What is claimed is:

1. A connecting rod connected to a piston installed in an engine, comprising:
an eccentric cam installed at a first connecting rod end of the connecting rod; and
an eccentric mechanism configured to adjust a phase of the eccentric cam,
wherein the eccentric mechanism includes a one-way clutch having ball components installed on left and right circular protruding portions of the eccentric cam, and front and rear cages with space portions that accommodate the ball components.

2. The connecting rod of claim 1, wherein the ball components are balls, rollers, needles, or bearings.

3. The connecting rod of claim 1, wherein the eccentric mechanism includes an oil supply device which has a first oil line and a second oil line formed at front and rear sides of the first connecting rod end, respectively, and configured to supply oil for operating the one-way clutch.

4. The connecting rod of claim 3, wherein the first oil line is connected to a first front side chamber to transmit hydraulic pressure to the front cage in the first connecting rod end, and a first rear side chamber to transmit hydraulic pressure to the rear cage, and the second oil line is connected to a second front side chamber to transmit hydraulic pressure to the front cage in the first connecting rod end, and a second rear side chamber to transmit hydraulic pressure to the rear cage.

5. The connecting rod of claim 4, wherein positions of the front and rear cages are determined by a difference in hydraulic pressure supplied from the first oil line and the second oil line, and a variable compression ratio varies as a height of a piston installed on the connecting rod equipped with the eccentric cam varies while the eccentric cam rotates clockwise or counterclockwise by the positions of the front and rear cages which are determined by the difference in hydraulic pressure.

6. The connecting rod of claim 1, wherein the eccentric mechanism includes:
a safety device having a cage stopper installed at any one side of the front and rear cages;
a stopper installed in the cage stopper; and
a spring elastically supporting the stopper, and the safety device restricts movements of the front and rear cages as the stopper is embedded and inserted into a groove formed in the circular protruding portion.

7. The connecting rod of claim 1, further comprising a second connecting rod end, wherein the first connecting rod end is smaller than the second connecting rod end.

* * * * *